United States Patent
Qian et al.

(10) Patent No.: US 10,419,635 B1
(45) Date of Patent: Sep. 17, 2019

(54) PRINTHEAD TEMPERATURE CONTROL

(71) Applicant: Hewlett-Packard Development Company, L.P., Houston, TX (US)

(72) Inventors: Li Qian, Sant Cugat del Valles (ES); Andrei Dafinoiu, Sant Cugat del Valles (ES); Oscar Martinez Bailac, Sant Cugat del Valles (ES); Chandrasekhar Nadimpalli, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/982,940

(22) Filed: May 17, 2018

(51) Int. Cl.
| | |
|---|---|
| *H04N 1/23* | (2006.01) |
| *B41J 2/045* | (2006.01) |
| *B41J 11/00* | (2006.01) |
| *H04N 1/00* | (2006.01) |

(52) U.S. Cl.
CPC .......... *H04N 1/2346* (2013.01); *B41J 2/0458* (2013.01); *B41J 2/04563* (2013.01); *B41J 2/04581* (2013.01); *B41J 11/002* (2013.01); *H04N 1/0005* (2013.01); *H04N 1/00015* (2013.01); *H04N 1/00042* (2013.01); *H04N 1/00082* (2013.01)

(58) Field of Classification Search
CPC .. B41J 2/04563; B41J 2/0458; B41J 2/04581; B41J 11/002; H04N 1/2346; H04N 1/00015; H04N 1/00042; H04N 1/0005; H04N 1/00082
See application file for complete search history.

(56) References Cited

U.S. PATENT DOCUMENTS

| | | | | |
|---|---|---|---|---|
| 5,477,246 A | * | 12/1995 | Hirabayashi | B41J 2/04528 347/12 |
| 5,500,667 A | * | 3/1996 | Schwiebert | B41J 11/002 219/216 |
| 7,101,010 B2 | * | 9/2006 | Holstun | B41J 2/04528 347/14 |
| 7,971,961 B2 | * | 7/2011 | Smythies | G06K 15/10 347/41 |
| 2015/0306888 A1 | | 10/2015 | Kalwa | |
| 2016/0207331 A1 | | 7/2016 | Pohlt | |

FOREIGN PATENT DOCUMENTS

| | | |
|---|---|---|
| CN | 200952082 | 9/2007 |
| CN | 106046940 | 10/2016 |

* cited by examiner

*Primary Examiner* — Thinh H Nguyen
(74) *Attorney, Agent, or Firm* — HP Inc. Patent Department

(57) ABSTRACT

A controller for a printing device includes print mode controller to determine whether a first or second print mode is to be used for a print job, and temperature controller to control a printhead temperature at least one of prior to and during printing the print job, the temperature controller to activate a printhead heater to cause the printhead temperature to be raised to a first temperature if the print mode controller determines that the first print mode is to be used, and the temperature controller to activate the printhead heater to cause the printhead temperature to be raised to a second temperature if the print mode controller determines that the second print mode is to be used, the second temperature different from the first temperature.

20 Claims, 8 Drawing Sheets

PRINTHEAD TEMPERATURE CONTROL

BACKGROUND

Printing devices may be used to print images onto various media. In some cases, a final image may be printed in sections, for example where a dimension of the final image exceeds a corresponding dimension of the medium on which it is to be printed. The sections may be combined, or tiled, after printing to produce the final image.

BRIEF DESCRIPTION OF THE DRAWINGS

Examples are further described hereinafter with reference to the accompanying drawings, in which.

DETAILED DESCRIPTION

Changes in a printing device during a printing process may lead to inconsistencies in color in the final image. Where the changes in the printing device are small and gradual, the changes in color due to color inconsistency in a continuously printed image are also likely to be small and gradual across or along a printed image. In this case, the color inconsistencies are unlikely to be noticeable to the human eye. In some cases, changes in the printing device leading to color inconsistencies may be, or include, changes in temperature of components of the printing device during a print process.

Where a final image is to be produced from a plurality of tiled sections, with each section being an individual print, neighboring or adjacent portions of the final image may be on different sections, such that the adjacent portions were not printed at approximately the same time. In such cases, the conditions in the printing device when the adjacent portions were printed may have differed significantly, leading to an abrupt inconsistency between the colors of the two adjacent portions. An abrupt (i.e. not gradual) increase in color inconsistency is more likely to be noticeable to the human eye. This may negatively affect the quality or usability of the final image.

In some printing devices the temperature of some components may tend to increase during the printing process. Greater variations in temperature during a printing process may lead to greater color inconsistency.

Figure 1:
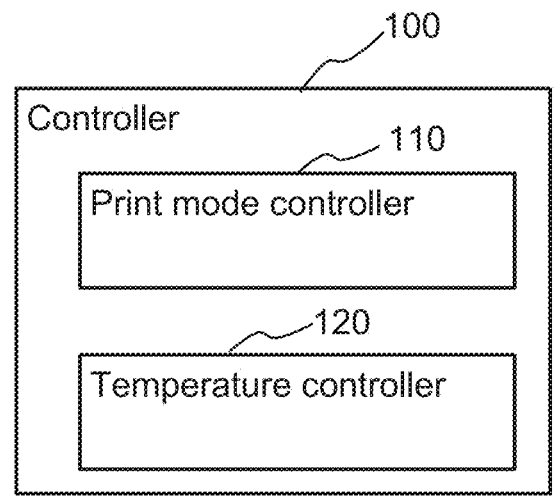
FIG. 1 illustrates a controller for a printing device.

FIG. 1 illustrates a controller 100 for a printing device according to an example. The controller 100 includes print mode controller 110 and temperature controller 120.

A print job may be received at the printing device. A print job may include instructions to print one or more images on one or more media, herein the images in a received print job are referred to as received images. The image printed on the medium may include printed elements in addition to the received image(s). In some examples a print job may include instructions to print multiple images corresponding with respective sections to be tiled together to form a final image after printing. However, in some examples, sections to be tiled together may be received separately in two or more print jobs. The print job may include details of the image(s) to be printed, details of a medium on which the image(s) are to be printed, etc.

When a print job is received, the print mode controller 110 determines a print mode associated with the print job. This determination may be based on information in or associated with the print job, such as a flag or field specifying or indicating the print mode to be applied during the processing of the print job. In some examples, a user input may be received that specifies or indicates the print mode to be applied during processing of the print job. In some examples, the print mode may be a previously selected print mode that is set for all print jobs until a different print mode is set. The print mode controller may be a combination of circuitry and executable instructions representing a control program to determine or select a print mode associated with a print job.

The print mode controller 110 may select a print mode from a set of print modes. The set of print modes may include a first print mode and a second print mode. For example, the print mode controller 110 may determine that the print mode is to be a first print mode or a second print mode. In some examples, additional print modes may be available for selection by the print mode controller 110, such that the set of print modes may include other print modes (e.g. a third print mode, a fourth print mode, etc.) in addition to the first and second print modes.

In some examples the second print mode may be associated with a higher color consistency in the final print than the first print mode. For example, the second print mode may be a tiled print mode intended for use when the print job includes sections of a final image that are to be printed separately and combined after printing. The first print mode may be a non-tiled print mode (i.e. where the final print is not intended to be produced by tiling individually printed sections).

Temperature controller 120 may be arranged to control a printhead temperature based on the print mode determination by the print mode controller 110. The temperature controller 120 may be a combination of circuitry and executable instructions representing a control program to perform printhead temperature control. The temperature controller 120 may be arranged to control a printhead temperature modification section to modify the temperature of the printhead, e.g., control or activate a printhead heater to cause the printhead temperature to rise. In an example, the temperature controller 120 may cause a target temperature or temperature threshold for the printhead temperature to be set to a first temperature if the print mode controller 110 determines that a first print mode is to be used, and the temperature controller 120 may cause the temperature threshold or target temperature for the printhead temperature to be set to a second temperature if the print mode controller 110 determines that a second print mode is to be used. The temperature threshold may be a lower temperature threshold, such that the temperature controller 120 is to control the printhead temperature to be at or above the lower temperature threshold.

The temperature controller 120 may control the printhead temperature before beginning the print job, during the print job, or before and during the print job. In some examples, the print mode controller 110 may determine the print mode at any time before the temperature controller 120 begins controlling the printhead temperature in accordance with the determined print mode. In some cases, the print mode controller 110 may determine the print mode for a print job after the print job as been received by the printing device.

In some examples the second temperature may be higher than the first temperature. This may result in a smaller variation in printhead temperature during the printing process in the second print mode when compared with a corresponding print in the first print mode. A smaller variation in printhead temperature may reduce color inconsistency during the printing process.

In some examples, the first temperature is in the range 40° C. to 50° C. In some examples the second temperature is in the range 50° C. to 60° C. In some examples the first temperature may be 45° C. and the second temperature may be 55° C.

Figure 2:
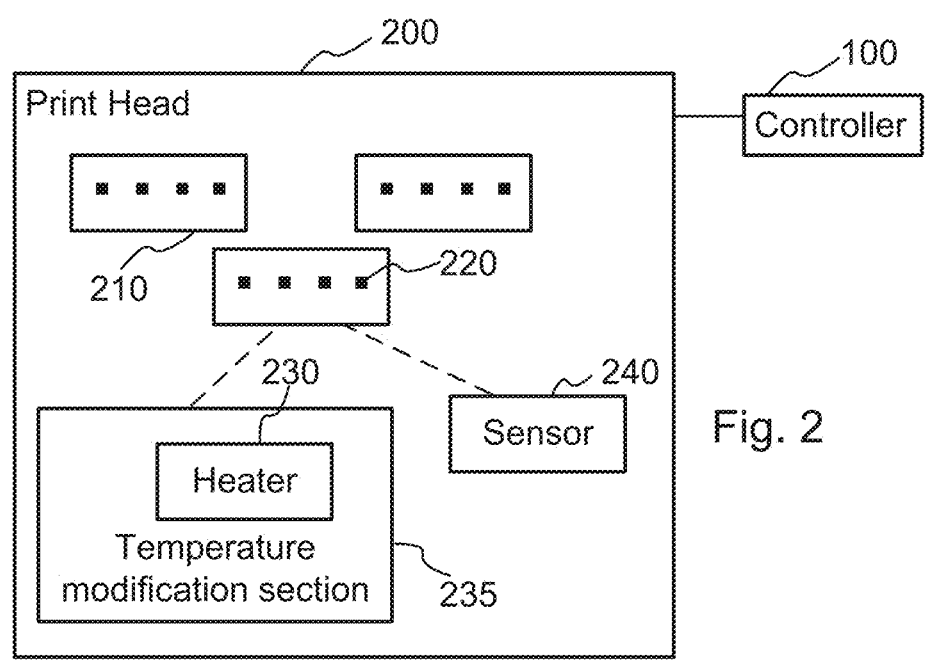
FIG. 2 illustrates a printhead.

FIG. 2 illustrates a printhead 200 according to some examples. The printhead 200 may include one or more dies 210. Each die 210 is a region of the printhead 200 that emits printing liquid. Each die 210 may include one or more nozzles 220. Each nozzle 220 is a hole that through which printing liquid passes during a printing process. Printing liquid may be delivered from the nozzle 220 to the print medium. The printhead 200 may be controlled by a controller 100, as described previously. In some examples, the dies 210 may be staggered and overlap along a transport direction of a medium. This may provide redundancy and improve print quality.

The printhead 200 may include a temperature modification section 230, including temperature modification element, e.g., a heater or heating system 230. In some examples, the printhead 200 may also include a sensor 240 to detect a temperature of the printhead 200.

In some examples, the heating system 230 may be arranged to independently heat different parts of the printhead 200. For example, a respective heater 230 or heating element in each die 210 may be independently controlled, such that the heating of each die 210 may be independently controlled. In other examples, a printhead heating element or elements may be controlled together (e.g. all activated or deactivated together).

In some examples the printhead 200 may have a plurality of sensors 240. The sensors 240 may provide respective indications of the temperature of corresponding portions of the printhead 200. This may facilitate independent control of temperature at distinct parts of the printhead 200, particularly where the heating of the distinct parts is independently controllable. In some examples providing a plurality of sensors 240 on the printhead 200 may improve performance where temperature varies significantly over the printhead 200. In some examples, the printhead 200 may be provided with a single sensor 240; this may reduce cost and complexity.

FIG. 2 illustrates the case of a heater 230 and sensor 240 associated with one of the dies 210. Other heaters and sensors (not shown) may be associated with the other dies.

In some examples heater 230 may include a dedicated heating element, such as a resistive heating element. The heating element may be inside or integrated with the printhead 200. The heating element may be attached or adhered to the printhead 200, or may be provided adjacent or proximal to the printhead 200. In some examples, the heating element may be a radiative heating element.

In some examples, the heating system 230 may be a trickle warming system. For example, the printhead 200 may include a firing resistor arranged to, in response to a received electrical current, rapidly heat the printing liquid in the printhead 200 in the region of a nozzle 220 to cause a drop of printing liquid to be ejected from the nozzle 220. However, providing a lower current that is too small to cause ejection of printing liquid will heat the printing liquid in the region of the nozzle 220. The printing liquid may, in turn, heat the printhead 200 or portions of the printhead 200.

In some examples, the heating system 230 may be a pulse warming system. Pulse warming provides one or more electrical pulses to a firing resistor, where the pulses are sufficiently short that printing liquid is not ejected from the nozzle 220. The electrical pulses result in heating of the firing resistor, and so a heating of the surrounding printing liquid. The printing liquid may, in turn, heat the printhead 200 or portions of the printhead 200.

Other heating elements and heating methods may be applied. More than one heating method may be applied in combination.

In some examples the sensor 240 may be a thermocouple. Other temperature sensing elements could alternatively be used. For example, a thermistor, a resistance temperature detector or a semiconductor temperature sensor.

In some examples, temperature controller 120 in controller 100 may receive an indication of a printhead temperature from a sensor 240 of the printhead. The temperature controller 120 may activate a printhead heater 230 in response to a determination that the printhead temperature is below a target temperature (e.g. the first temperature in the first print mode and the second temperature in the second print mode). The temperature controller 120 may deactivate a printhead heater 230 in response to a determination that a temperature of the printhead 200 is at or above the target temperature.

In some examples, the temperature controller 120 may provide a signal to a printhead heater 230, the signal indicating a target temperature. The printhead heater 230 may receive an indication of the current printhead temperature from a printhead temperature sensor 240, and may activate a heating element in response to a determination that the temperature indicated by the temperature sensor 240 is below the target temperature. The heater 230 may deactivate the heating element in response to an indication from the temperature sensor 240 that a printhead temperature is equal to, or above, the target temperature.

In some examples, activation and deactivation of the heating elements may include hysteresis. For example, if the target temperature is T, the heater may be activated if the temperature is below T, and deactivated if the temperature is above T+δT, where δT is a small temperature increment, e.g. 0.25° C.

Other distributions of control elements and temperature regulation methods may alternatively be applied.

In some examples, the target temperature (e.g. first temperature in the first print mode or the second temperature in the second print mode) is a target lower temperature threshold temperature. For example, the printing process may cause heating that increases the temperature above the target temperature. However, if the temperature falls to or below the target temperature, the temperature controller 120 may cause additional printhead heating (i.e. in addition to the heating due to the printing process itself) until the printhead temperature reaches the target temperature.

In some examples, a printing device may include a plurality of printheads. In some examples the temperature of the printheads may be controlled independently (e.g. by the provision of independent heating elements and sensors associated with respective print heads). In some examples a print job may use fewer than all printheads of the printing device. In some examples, printheads that are not to be used for a print job are not heated by the temperature controller 120. As those printheads are not active during the print job, the absence of heating does not affect the print quality or color consistency.

Figure 3:
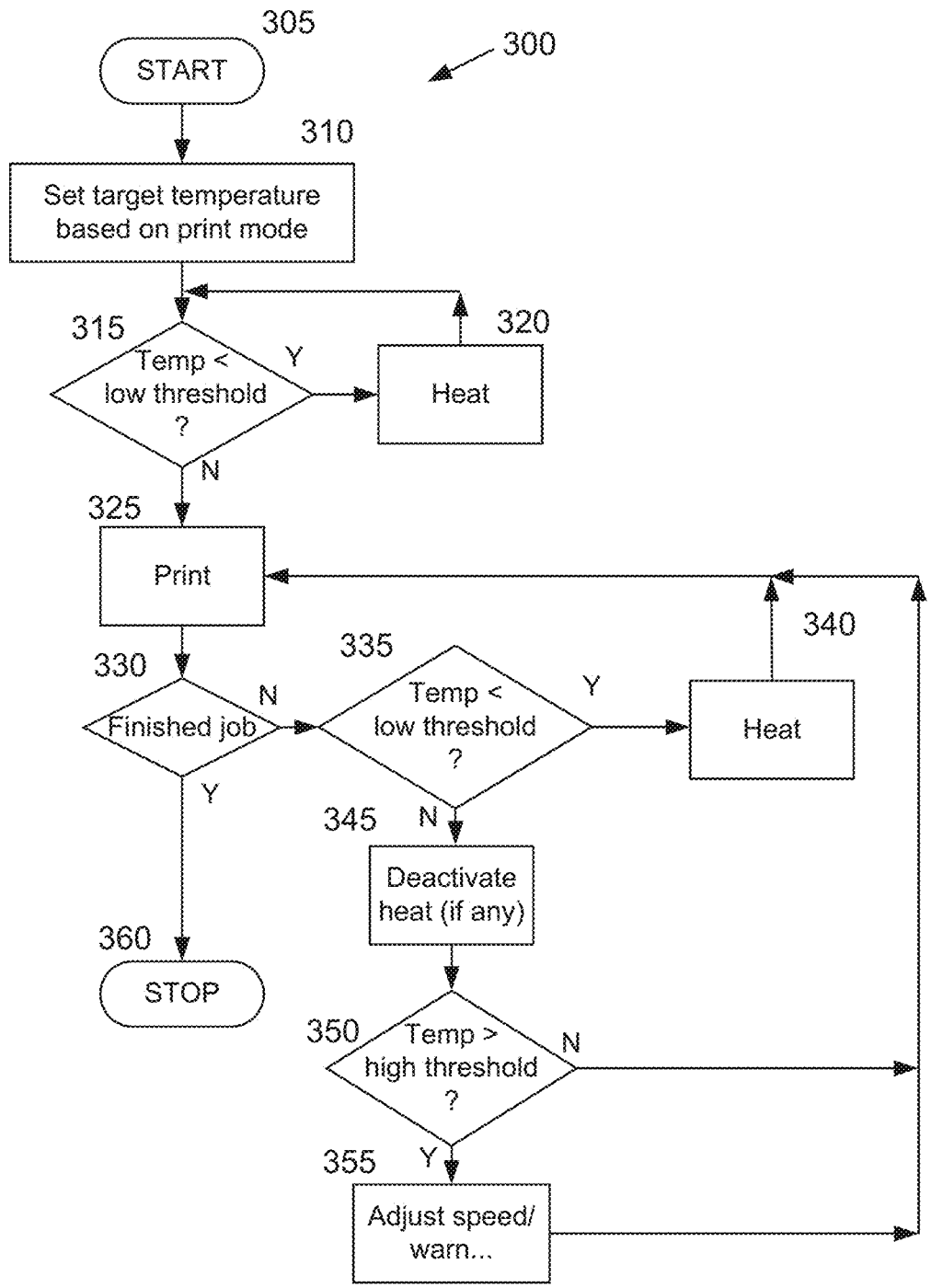
FIG. 3 illustrates a method of controlling a printhead temperature.

FIG. 3 illustrates a method 300 of controlling the printhead temperature according to some examples. The method begins at 305 and at 310 a target (lower temperature threshold) temperature is set. At 315, prior to printing beginning, it is determined if the temperature is below the target (lower temperature threshold) temperature. If the temperature is determined to be below the target temperature at 315, the printhead 200 is heated at 320, and processing returns to 315. When the temperature is at or above the target temperature, printing begins at 325.

While the print job is ongoing (No at 330) the temperature is monitored at 335 to determine if the printhead temperature is below the lower temperature threshold. If the temperature is below the lower temperature threshold, heating is applied at 340 and printing continues at 325.

If the temperature is determined not to be below the lower temperature threshold at 335, heating of the printhead is deactivated or reduced at 345. The temperature monitoring determines, at 350, if the temperature exceeds an upper temperature threshold value, such as a preset upper value. The upper temperature threshold value may represent a temperature above which print quality may be degraded. In some examples, the printhead 200 reaching or exceeding the upper temperature threshold value may indicate that a fault has occurred in the printhead 200.

If the upper temperature threshold temperature has not been exceeded, printing continues at 325. If the upper temperature threshold temperature has been exceeded, remedial action may be taken at 355. For example, a speed of the printing process may be reduced to reduce a rate at which the printhead 200 is heated by the printing process. Additionally, or alternatively, remedial action may include issuing a warning to a user. In some examples, remedial action may include halting (not shown in FIG. 3) the printing processes, e.g. until a user restarts the process.

When the print job has been completed (Yes at 330) the method terminates at 360.

Figure 4:
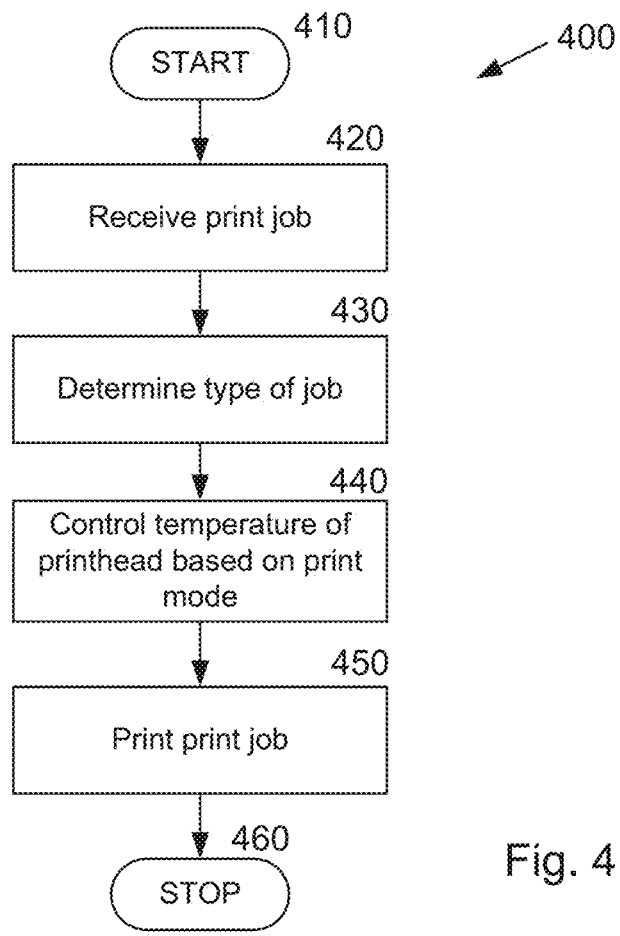
FIG. 4 illustrates a method of printing a print job.

FIG. 4 shows an example method 400 according to some examples. The method begins at 410. A print job is received by a printing apparatus at 420. A type of the print mode may be determined. For example, it may be determined if the print job is a tile mode print job (i.e. a print job in which individually printed sections are to be combined to produce a final, tiled, image), or if the print job is a non-tile mode print job. Printhead temperature is controlled, at 440, in accordance with the determination at 430. The print job is printed at 450. The method terminates at 460.

In some examples, controlling the printhead warming may include setting a higher temperature when the print job is determined to be a tile mode print job than when the print job is determined to be a non-tile mode print job.

Figure 5:
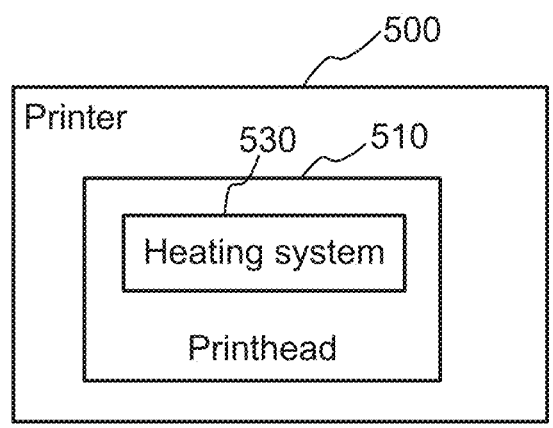
FIG. 5 illustrates a printer.

FIG. 5 shows an example printer 500 according to some examples. The printer 500 includes a printhead 510 and a temperature modification element, e.g., a printhead heating system 530. The printhead heating system 530 may be arranged to increase the temperature of the printhead 510 to a first temperature when a first print mode is in use or to be used. The printhead heating system 530 may be arranged to increase the temperature of the printhead 510 to a second temperature, higher than the first temperature, when a second print mode is in use or to be used. The heating may be in preparation for, or during, printing (i.e. including, possibly, heating both in preparation for, and during, printing).

The heating system 530 is illustrated inside the printhead 510 in FIG. 5 but may be located externally to the printhead. In some examples the heating system 530 may include, or be controlled by, controller 100.

In some examples the heating system 530 may include or may be in communication with a temperature sensor that senses a temperature at a location to be heated by the heating system.

In some examples, the first print mode may be a non-tiled print mode and the second print mode may be a tiled print mode.

Figure 6:
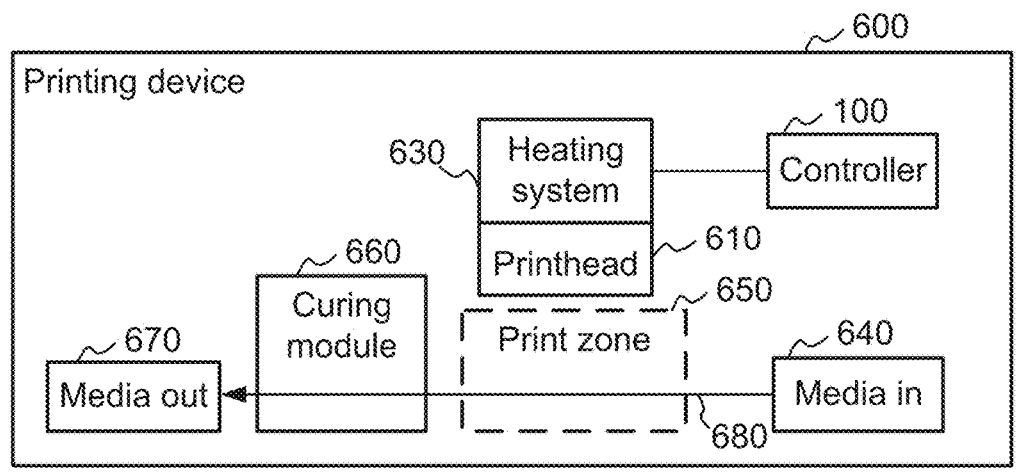
FIG. 6 illustrates a printing device.

FIG. 6 illustrates a printing device 600 according to some examples. Printing device 600 may include a controller, such as controller 100, a printhead 610 and a printhead heating system 630. The printing device 600 may also include a media input 640 for receiving media (e.g. blank media) to be printed on. The media may be, for example, provided as a sheet or as a roll. Example media include paper, canvas, fabric, films, etc.

The printing device 600 may include a media transport path 680, along which media are to be transported, the media transport path passing through a print zone 650. The print zone 650 is a region of the printing device 600 in which an image is transferred to the medium by the printhead 610. After the image has been printed on the medium, the media transport path 680 may transport the media to an output 670. The output 670 may pass the medium to a post-processing unit, a finishing unit, etc. In some examples, the printing device 600 may include a curing module 660. The media transport path 680 may pass through the curing module 660 after the media transport path 680 leaves the print zone 650, and before the media transport path 680 arrives at the output 670. The curing module 660 may cure the printing liquid on the medium, e.g. by heating the medium to dry the printing liquid and fix the image to the medium.

In some examples the printhead 610 may be a pagewide printhead. The medium is moved passed the printhead 610 (or the printhead 610 is moved relative to the medium) in a transport direction (e.g. a medium transport direction), and the printhead 610 is substantially stationary (relative to the medium) in a direction perpendicular to the transport direction during the printing process.

In some examples, the printhead 610 may be a scanning printhead. The medium is moved passed the printhead 610 (or the printhead 610 is moved relative to the medium) in a medium transport direction, and the printhead 610 is scanned across the medium in a scanning direction that is different from the medium transport direction, e.g. perpendicular to the transport direction.

The printhead 610 may be an ink-jet printhead, for example.

The printhead 610 may be, for example, a thermal inkjet printhead, a piezo printhead, etc.

In some examples, in response to determining that the print mode is the second print mode, the controller 100 may automatically enable a system preheat system. In contrast, the system preheat system may be disabled in the first print mode. The system preheat system may heat elements of the printer (other than the printhead or printheads) prior to beginning printing of the image. In some examples, the system preheat system may heat one or more of a curing module 660 or a print zone 650 of the printer. In some examples the system preheat system may heat the curing module 660 by activating curing heaters in the curing module. In some examples, the system preheat system may heat the print zone 650 by activating an infrared lamp, or a warm air system arranged to blow warm air onto or into the print zone 650. Other heating arrangements may additionally or alternatively be provided.

The system preheat system may increase, before printing, the temperature of elements of the printing device that typically become warmer during printing. This heating before printing may reduce a temperature variation of those elements during the printing process. Reduced temperature variations may reduce or eliminate color inconsistencies in the final printed image.

Figure 7:
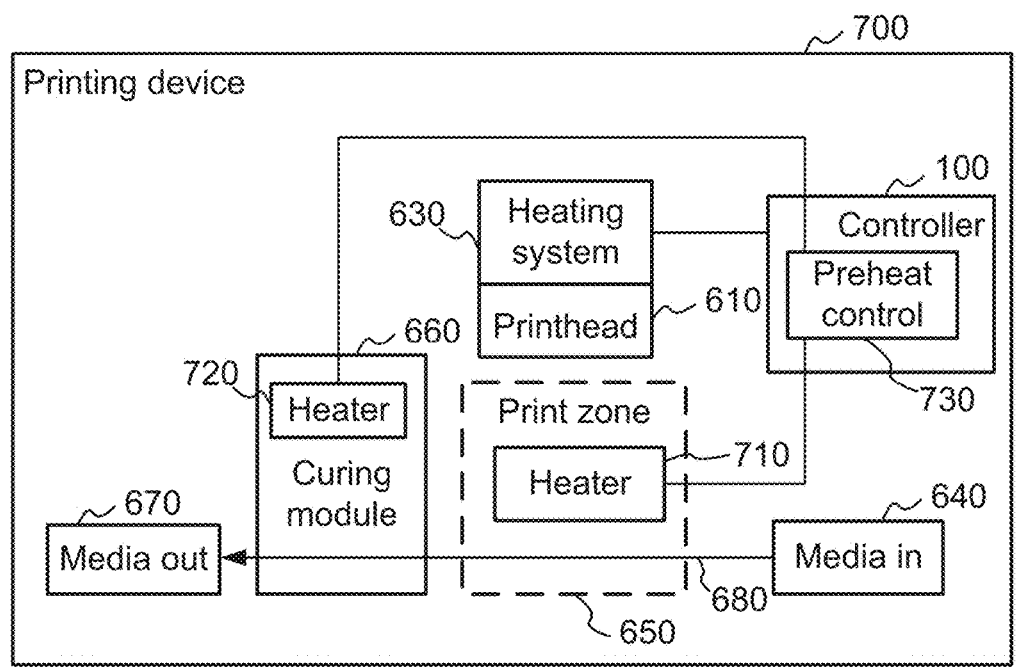
FIG. 7 illustrates a printing device having preheat control.

FIG. 7 illustrates the printing device 700 including a system preheat system. The printing device 700 of FIG. 7 may also include similar elements to the printing device 600 of FIG. 6. The system preheat system of FIG. 7 includes heater 710 for heating or warming the print zone 650. The system preheat system of FIG. 7 also includes a heater 720 for heating or warming curing module 660. In the example of FIG. 7 the heaters 710 and 720 are controlled by controller 100. In some examples, the heaters 710 and 720 may be controlled by preheat controller 730 of controller 100.

Temperature sensors may be provided to monitor the temperature of the elements to be heated by the system preheat system, to allow feedback control of the heaters of the system preheat system.

In some examples a preparation plot may be printed prior to printing the received image or images when the print mode is determined to be the second print mode. In some examples, no preparation plot is printed in the first print mode. The preparation plot may be a full area plot with uniform usage across all color channels (in some examples, this may exclude color channels that are not to be used in the print job, such that all active color channels are included in the preparation plot). The preparation plot may be printed across a whole width of the medium (or a whole printable width of the medium, if this is less). Changes in the printhead 610, and other elements of the printing device, that normally occur at the start of printing may take place during printing of the preparation plot. This may reduce a degree of variation in those elements of the printing device during printing of the received image or images.

For example, the preparation plot may increase the temperature of the printhead 610 prior to printing a received image, such that a temperature of the printhead 610 at the start of printing the received image is closer to a temperature of the printhead 610 at a mid-point or end of printing the received image, for example. This may reduce temperature variation during the printing of the print job, and so may reduce color inconsistency during the print job.

Figure 8:
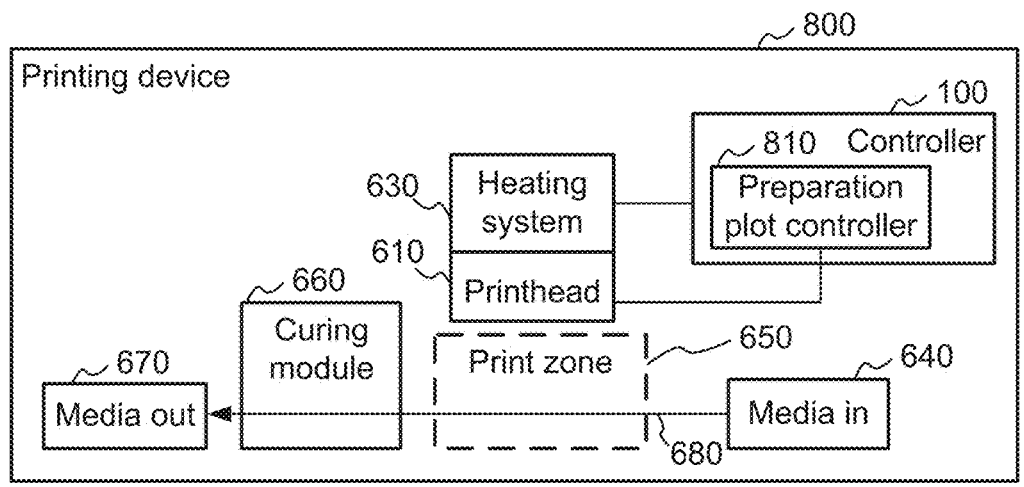
FIG. 8 illustrates a printing device having a preparation plot controller.

FIG. 8 shows an example of printing device 800. Printing device 800 may include similar elements to printing device 600. The controller 100 of printing device 800 may include preparation plot controller 810. The preparation plot controller may be a combination of circuitry and executable instructions representing a control program to cause a preparation plot to be printed. Preparation plot controller 810 may cause a preparation plot to be printed in response to a determination that the print mode is to be the second print mode. In some examples, the preparation plot controller 810 is arranged not to print a preparation plot in response to a determination that the print mode is to be the first print mode.

In some examples, the preparation plot controller 810 is arranged to add instructions to the print stream corresponding to the print job, the instructions to cause the preparation plot to be printed. The preparation plot controller 810 may be arranged to add the instructions to the print stream following receipt of the print job by the printing device and prior to carrying out printing of a received image.

Figure 9:
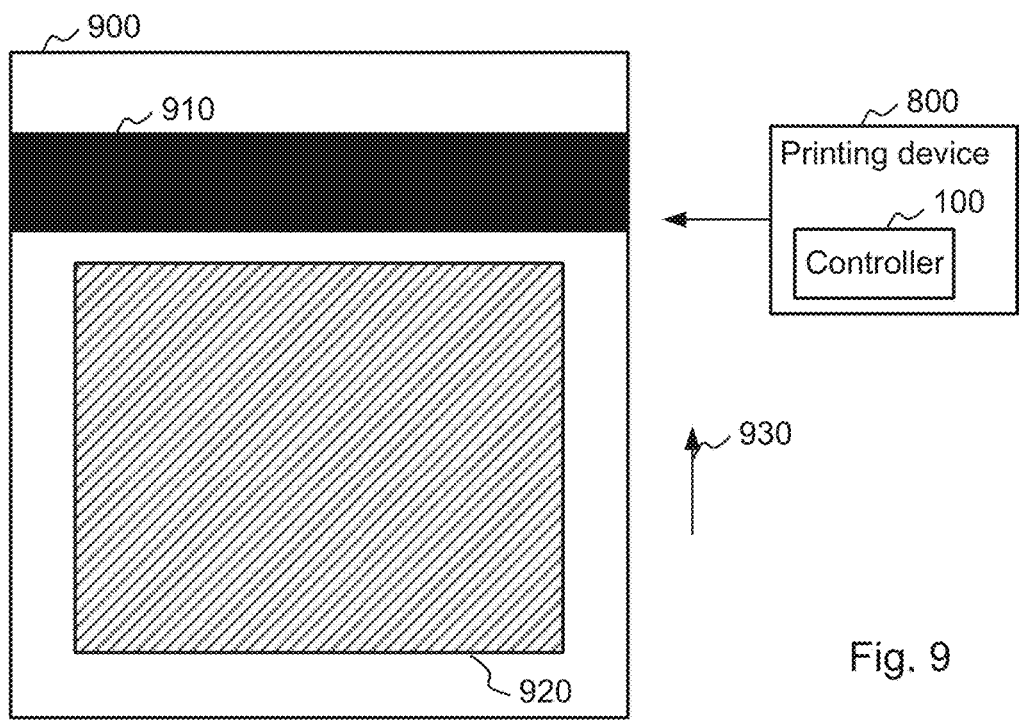
FIG. 9 illustrates an example of a printed medium printed by the printing device of FIG. 8.

FIG. 9 shows an example of a printed medium 900 printed by printing device 800 of FIG. 8 in the second print mode. A preparation plot 910 and a received image 920 are printed on the medium 900. The spatial relationship between the printing device 800 and medium 900 are schematic. Arrow 930 indicates the transport direction, in which the medium 900 is moved relative to the printhead. The portion of the medium 900 corresponding with the preparation plot passes through the print zone 680 before the portion of the medium 900 corresponding with the received image 920 (image according to the print job).

In some examples, where a print job includes multiple images (e.g. a plurality of received images corresponding with respective sections of a tiled print) a preparation plot 910 may be printed prior to each received image. In other examples, a single preparation plot 910 may be printed prior to printing the first received image of the print job, and the subsequent received images of the print job may be printed without a corresponding preparation plot 910.

In some examples the preparation plot 940 may be 1 m long in the transport direction 930, but other lengths could alternatively be chosen.

Figure 10:
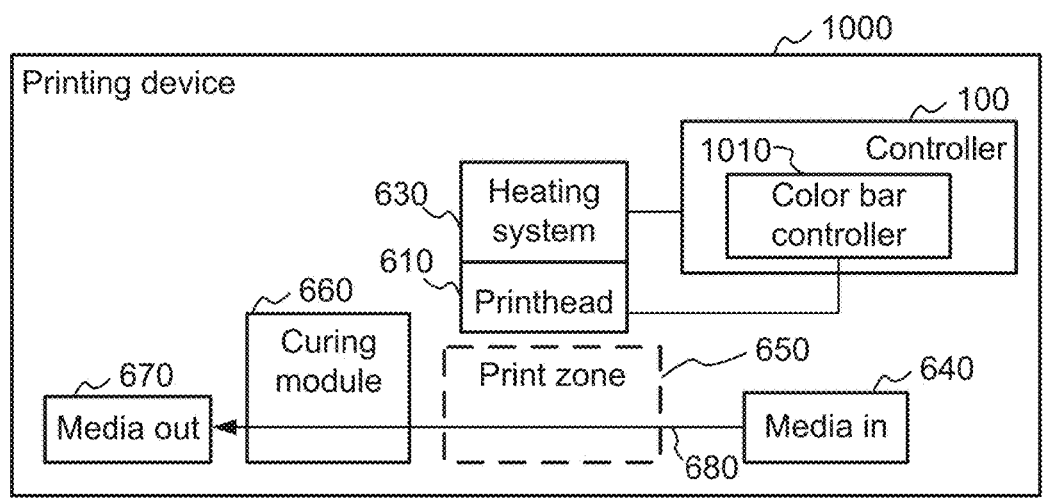
FIG. 10 illustrates a printing device having color bar controller.

FIG. 10 shows an example of printing device 1000. Printing device 1000 may include similar elements to printing device 600. The controller 100 of printing device 1000 may include color bar controller 1010. Color bar controller may be a combination of circuitry and executable instructions representing a control program to cause one or more color bars to be printed. Color bar controller 1010 may cause sideway color bars to be printed in response to a determination that the print mode is to be the second print mode. In some examples, the color bar controller 1010 is arranged not to print sideway color bars in response to a determination that the print mode is to be the first print mode.

In some examples, the color bar controller 1010 is arranged to add instructions to print the sideway color bars to the print stream corresponding to the print job.

Figure 11:
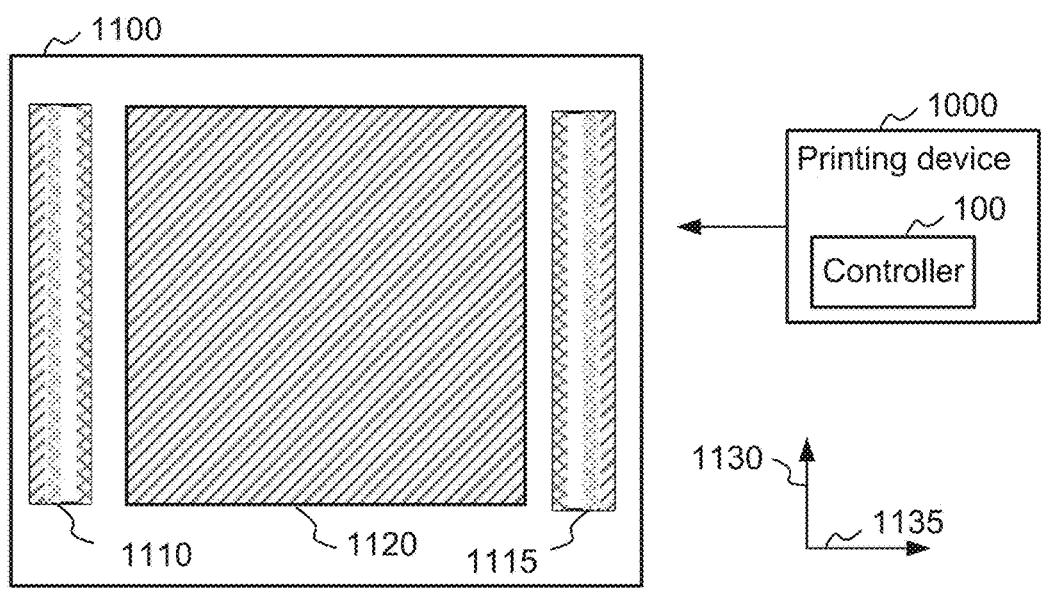
FIG. 11 illustrates an example of a printed medium printed by the printing device of FIG. 10.

FIG. 11 shows an example of a printed medium 1100 printed by printing device 1000 of FIG. 10 in the second print mode, where the printing device 1000 prints in swathes by moving the printhead relative to the medium 1100 in a direction different from (e.g. perpendicular to) the transport direction 1130. Sideway color bars 1110 and 1115 are printed on the medium 1100 either side of a received image 1120. The spatial relationship between the printing device 1000 and medium 1100 are schematic. Arrow 1130 indicates the transport direction, in which the medium is moved relative to the printhead (e.g. along a transport path). Arrow 1135 indicates the swathe direction, which is perpendicular to the transport direction 1130 in this example. Within each swathe, the portion of the medium 1100 corresponding with one of the sideway color bars 1110 or 1115 is printed before the image 1120, and the other sideway color bar 1115 or 1115 is printed after the image 1120, depending on the direction of the swathe.

Sideway color bars 1110 and 1115 are printed either side of the image 1120. That is, the sideway color bars 1110 and 1115 are printed before and after image 1120, along a direction perpendicular to the transport direction 1130, such that the sideway color bars are parallel to the transport direction 1130. The sideway color bars are thin (relative to image 1120) strips of color and may each include respective strips of a plurality of colors. In some examples the colors in color bar 1110 are the same as the colors in color bar 1115, while in other examples color bars 1110 and 1115 may include different colors.

In some examples the colors within a color bar 1110, 1115 may be printed in different orders in different swathes, such that the color bars will not include stripes of separate colors along the transport direction 1130. However, including stripes of separate colors may reduce complexity, and may improve uniformity during the printing process.

Printing sideway color bars 1110, 1115 may improve image quality and color uniformity in image 1120 by warming the printhead in each swathe prior to printing image 1120 and clearing some defects that can affect image quality (such as decap, pigment enrichment, streakiness, etc.)

In some examples a single sideway color bar may be printed on one side of the image 1120. In some examples, a portion of a sideways color bar may be printed on one side of the received image 1120 when the swathe is in a first direction and printed on the other side of the received image 1120 when the swathe is in a second direction opposite the first direction.

In some examples two or more of print mode-dependent printhead warming, system preheat, preparation plot and sideway color bars may be used in combination in a second print mode, and not used in a first print mode.

Figure 12:
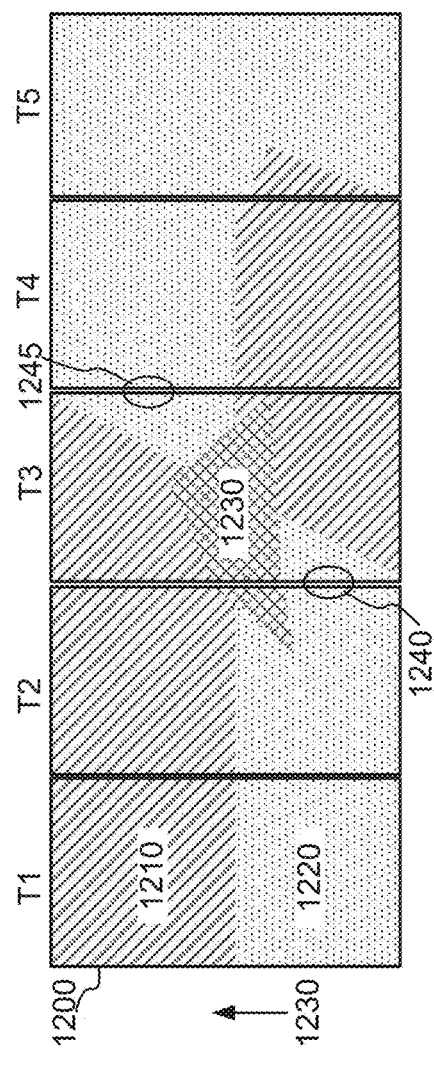
FIG. 12 illustrates a test print and temperature variation of the printheads during printing of the test print in two print modes.
Figure 12:
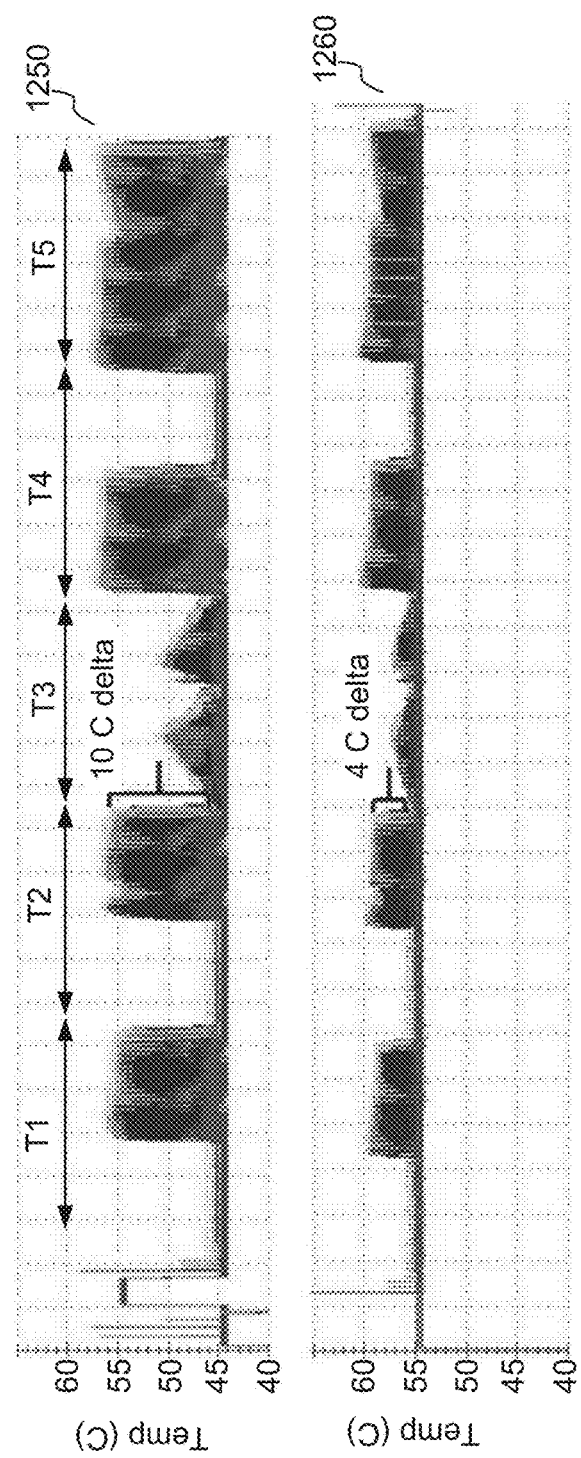

FIG. 12 shows an example of a test print 1200 having five tiles (T1, T2, T3, T4 and T5). The test print includes three different colors 1210, 1220, 1230 shown using different shading. FIG. 12 also shows temperature variation of the printheads during printing of the five tiles. 1250 shows the temperature variation in a first print mode, and 1260 shows the temperature variation in a second print mode. In this example, each tile was approximately 100 inches (2.54 m) in the transport direction by 50 inches (1.27) perpendicular to the transport direction.

Arrow 1230 indicates the transport direction, such that the top edge of tile T1 of 1200 is printed before the bottom edge of tile T1. After tile T1 has been printed, tile T2 is printed (starting at the top edge).

According to this example, the second print mode heats the printhead to 55° C. (i.e. sets a second temperature of 55° C.). The second print mode also makes use of system preheat, a preparation plot and sideway color bars. The first print mode heats the printhead to 45° C. (i.e. sets a first temperature of 45° C.). The first print mode does not use system preheat, a preparation plot or sideway color bars.

As can be seen, in the first print mode, the temperature variation during the printing has a range of around 10° C. In contrast, in the second print mode, the temperature variation during the printing has a range of around 4° C.

In the example print 1200, color inconsistency is likely to be most noticeable in regions 1240 and 1245. Printing color 1210 in the first print mode causes a slight increase in printhead temperature. In contrast, printing color 1220 in the first print mode causes a much greater increase in printhead temperature. This is reflected in the temperature profile for T1 in 1250. The temperature is initially around 45° C. for the first portion of T1, corresponding to color 1210. When color 1220 is printed (beginning around half way through T1), the temperature increases to around 55° C. T1 and T2 have similar temperature profiles, such that portions on the right edge of T1 are printed at a similar temperature to the corresponding (adjacent) portion on the left edge of T2. Because of this, color inconsistency is unlikely to be noticeable at the boundary between T1 and T2. In contrast, the color pattern is significantly different between T2 and T3 in a manner that leads to different temperature profiles when printing these tiles. Thus, when the portion of 1240 on T2 is printed, the printhead temperature is around 55° C. When the portion of 1240 on T3 is printed, the printhead temperature is around 48° C. This temperature difference of around 7° C. may lead to noticeable color inconsistencies.

Similarly, T3 and T4 have different temperature profiles, such that noticeable color inconsistency may be observable in region 1245. In particular, when the portion of region 1245 on T3 is printed, the printhead temperature is around 48° C. When the portion of region 1245 on T4 is printed, the printhead temperature is around 55° C. This temperature difference, of around 7° C., when printing neighboring or adjacent portions of the final image may leady to noticeable color inconsistencies.

In the second print mode, the temperature of the printhead when printing region 1240 of T2 is around 60° C. and the printhead temperature when printing region 1240 of T3 is around 57° C. The temperature difference of around 3° C. is less likely to result in noticeable color inconsistencies in region 1240 in the second print mode when compared with the first print mode.

Similarly, the printhead temperature when printing region 1245 varies between around 57° C. and 60° C. when printing T3 and T4, respectively. Again, a 3° C. temperature difference when printing region 1245 in the second print mode is less likely to result in noticeable color inconsistencies than a 7° C. temperature difference in the first print mode.

In some examples, the first print mode may be more suitable for higher speed printing than the second print mode. In some examples, the first mode may use less ink than the second mode, for example where the second mode includes a preparation plot and the first mode does not. In some examples the first print mode may be a lower energy print mode than the second print mode. In some examples the first mode may have a lower cost per print than the second mode, and may print with a higher speed than the second mode.

In order to estimate the degree to which differences in color can be perceived by the human eye, the International Commission on Illumination (CIE) devised dE measures, such as dE00 (also referred to as delta E 2000). dE00 is a color-difference formula that gives an indication of perceptibility of color difference between two colors on a scale of 0 to 100. Values less than 1 indicate that the human eye can not perceive a difference between the two colors. A difference between 1 and 2 indicates that the difference is perceptible with close observation, with values between 2 and 10 indicating that the difference is perceptible at a glance. A value of 100 indicates that the colors are exact opposites.

dE00 is calculated in the CIELAB color space for a pair of colors $(L^*_1, a^*_1, b^*_1)$ and $(L^*_2, a^*_2, b^*_2)$ as:

$$\Delta E^*_{00} = \sqrt{\left(\frac{\Delta L'}{k_L S_L}\right)^2 + \left(\frac{\Delta C'}{k_C S_C}\right)^2 + \left(\frac{\Delta H'}{k_H S_H}\right)^2 + R_T \frac{\Delta C'}{k_C S_C} \frac{\Delta H'}{k_H S_H}},$$

Where:

$$\Delta L' = L^*_2 - L^*_1, \overline{L} = \frac{L^*_1 + L^*_2}{2}, \overline{C} = \frac{C^*_1 + C^*_2}{2},$$

-continued $$C_1^* = \sqrt{a_1^{*2} + b_1^{*2}}, C_2^* = \sqrt{a_2^{*2} + b_2^{*2}}$$

$$a_1' = a_1^* + \frac{a_1^*}{2}\left(1 - \sqrt{\frac{\overline{C}^7}{\overline{C}^7 + 25^7}}\right), a_2' = a_2^* + \frac{a_2^*}{2}\left(1 - \sqrt{\frac{\overline{C}^7}{\overline{C}^7 + 25^7}}\right)$$

$$\overline{C}' = \frac{C_1' + C_2'}{2}, \text{ and } \Delta C' = C_2' - C_1',$$

where $C_1' = \sqrt{a_1'^2 + b_1^{*2}}, C_2' = \sqrt{a_2'^2 + b_2^{*2}}$ $h_1' = \text{atan2}(b_1^*, a_1')\text{mod}360°, h_2' = \text{atan2}(b_2^*, a_2')\text{mod}360°$ $$\Delta h' = \begin{cases} h_2' - h_1', & |h_1' - h_2'| \leq 180° \\ h_2' - h_1' + 360°, & |h_1' - h_2'| > 180°, h_2' \leq h_1' \\ h_2' - h_1' - 360°, & |h_1' - h_2'| > 180°, h_2' > h_1' \end{cases}$$

$$\Delta H' = 2\sqrt{C_1'C_2'}\sin(\Delta h'/2),$$

$$\overline{H}' = \begin{cases} (h_1' + h_2' + 360°)/2, & |h_1' - h_2'| > 180° \\ (h_1' + h_2')/2, & |h_1' - h_2'| \leq 180° \end{cases}$$

$$T = 1 - 0.17\cos(\overline{H}' - 30°) + 0.24\cos(2\overline{H}') +$$
$$0.32\cos(3\overline{H}' + 6°) - 0.2\cos(4\overline{H}' - 63°)$$

$$S_L = 1 + \frac{0.015(\overline{L} - 50)^2}{\sqrt{20 + (\overline{L} - 50)^2}}, S_C = 1 + 0.045\overline{C}', S_H = 1 + 0.015\overline{C}'T$$

$$R_T = -2\sqrt{\frac{\overline{C}'^7}{\overline{C}'^7 + 25^7}}\sin\left[60° \cdot \exp\left(-\left[\frac{\overline{H}' - 275°}{25°}\right]^2\right)\right]$$

$k_L = 1, k_C = 0.045, \text{ and } k_H = 0.015.$

Table 1 shows dE00 for samples of each of tiles 1, 2, 4 and 5 relative to tile 3 for the example of FIG. 12 in the first and second print modes. An averaged color value was determined based on ten measurements in region 1240. Similar averages color values were determined for tile 2, based on ten measurements in region 1240 of tile 2. A similar average value was determined for tile 1, based on a region that would be adjacent to region 1240 of tile 3 if tiles 1 and 3 were tiled adjacent to each other. A similar averaged color value was determined for region 1245 of tile 3 and corresponding regions of tiles 4 and 5 that would be adjacent to region 1245 of tile 3. All of the measurements were of color 1220. Table 1 shows that the first print mode produces dE00 values greater than 1, such that color inconsistencies are likely to be noticeable. In contrast, the second print mode produces dE00 values that are less than 1, such that color inconsistencies are not likely to be noticeable.

TABLE 1

| Tile | Print mode 1 | Print mode 2 |
|------|--------------|--------------|
| 1    | 1.8          | 0.5          |
| 2    | 1.3          | 0.5          |
| 4    | 1.5          | 0.6          |
| 5    | 1.8          | 0.85         |

Figure 13:
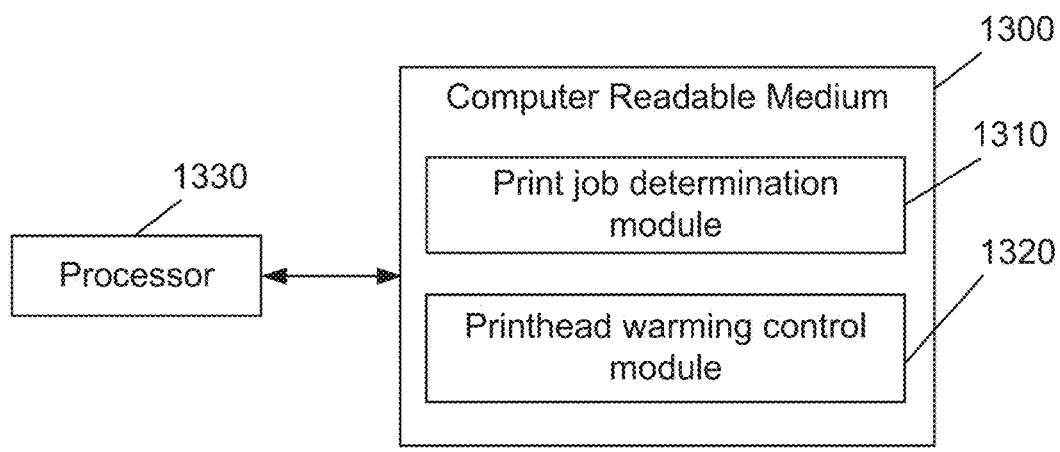
FIG. 13 illustrates a computer readable medium.

FIG. 13 illustrates a computer readable medium 1300 according to some examples. The computer readable 1300 stores units or modules, with each unit or module including instructions that, when executed, cause a processor 1330 or other processing device to perform particular operations. The computer readable medium 1300 includes a print job determination module 1310 including instructions that, when executed, cause a processing device 1330 to determine a print mode of a print job. In some examples, print job determination module 1310 determines whether the print job is a tile mod print job or a non-tile mode print job. The computer readable medium 1300 also includes a printhead warming control module 1320 that, when executed, cause the processing device 1330 to control warming of a printhead based on the determination by the print job determination module 1310. The units of the computer readable medium 1300 may cause a processing device 1330 to operate in accordance with any of the examples described herein. The computer readable medium may be a non-volatile computer readable medium. For example, the computer readable medium may be a hard disc, optical disc, non-volatile memory, etc.

In some examples the second print mode may be a mode for high color consistency. This may be, for example, a tiling mode, but could alternatively be a mode that is not associated with tiling, but in which a higher than normal (e.g. relative to a first print mode) color consistency is to be achieved.

The examples have been described with reference to a printhead temperature modification section 235 that includes a heater 230. In some examples the temperature modification section 235 may additionally or alternatively include one or more coolers respectively arranged to reduce the temperature of an associated printhead 200 or portion of a printhead 200. The temperature controller 120 may control the cooler to reduce the temperature of the printhead 120 to below an upper temperature threshold temperature. In some examples the temperature controller may control the cooler before, during, or before and during printing to set or maintain the temperature of the printhead below the upper temperature threshold temperature.

In some examples, the controller may activate the cooler in operation 355 of FIG. 3 in response to a determination in operation 350 that a printhead temperature has exceeded or is approaching the upper temperature threshold. In some examples, the method of FIG. 3 may be modified to include determining, prior to printing at 325, whether the printhead temperature is above a target value (upper temperature threshold), and if the temperature is above the target value, taking remedial action (e.g. issuing a warning to a user, waiting for user confirmation, waiting for the printhead temperature to decrease, cooling the printhead, etc.) before proceeding to printing at operation 325.

In some examples, the upper temperature threshold temperature may be set to a third temperature in the first print mode, and may be set to a fourth temperature in the second print mode. The third temperature may be higher than the first temperature. The fourth temperature may be higher than the second temperature. In some examples, the third and fourth temperatures may be different. The fourth temperature may be lower than the third temperature, for example, the third temperature may be 65° C. and the fourth temperature may be 60° C. In some examples the third and fourth temperature may be the same, e.g. 65° C.

The cooler may include, for example, one or more of a heat exchanger, a heat pump, a thermoelectric cooler, etc.

Examples herein that include a heating system could alternatively or additionally include a cooling system including a cooler.

The examples herein have been described in relation to two-dimensional printing on a medium, but could also apply to three-dimensional printing, e.g. on a print target, such as a bed of build material.

Throughout the description and claims of this specification, the words "comprise" and "contain" and variations of them mean "including but not limited to", and they are not intended to (and do not) exclude other components, integers or operations. Throughout the description and claims of this specification, the singular encompasses the plural unless the context suggests otherwise. In particular, where the indefinite article is used, the specification is to be understood as contemplating plurality as well as singularity, unless the context suggests otherwise.

Features, integers or characteristics described in conjunction with a particular aspect or example are to be understood to be applicable to any other aspect or example described herein unless incompatible therewith. All of the features disclosed in this specification (including any accompanying claims, abstract and drawings), and/or all of the operations of any method or process so disclosed, may be combined in any combination, except combinations where at least some of such features and/or operations are mutually exclusive. Examples are not restricted to the details of any foregoing examples. The Examples may extend to any novel one, or any novel combination, of the features disclosed in this specification (including any accompanying claims, abstract and drawings), or to any novel one, or any novel combination, of the operations of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A controller for a printing device, comprising:
   a print mode controller to determine whether a first or second print mode is to be used for a print job, wherein the second mode is a tiled print mode in which the print job is divided into a plurality of separately-printed tiles that contain contiguous parts of an image of the print job and the first mode is a non-tiled print mode, and
   a temperature controller to control a printhead temperature at least one of prior to and during printing the print job,
      the temperature controller to activate a printhead heater to cause the printhead temperature to be raised to a first temperature if the print mode controller determines that the first print mode is to be used, and
      the temperature controller to activate the printhead heater to cause the printhead temperature to be raised to a second temperature if the print mode controller determines that the second print mode is to be used, the second temperature different from the first temperature.

2. The controller of claim 1, further comprising a preparation plot controller to insert into a plot stream a preparation plot with uniform usage across all active color channels for printing prior to printing the print job.

3. The controller of claim 1, wherein the second temperature is higher than the first temperature.

4. The controller of claim 1, wherein the first temperature is in the range 40° C. to 50° C., and the second temperature is in the range 50° C. to 60° C.

5. The controller of claim 4, wherein the first temperature is 45° C., and the second temperature is 55° C.

6. The controller of claim 1, wherein the temperature controller is further to monitor the printhead temperature during printing of the print job and control the printhead temperature based on the monitoring.

7. The controller of claim 1 further comprising at least one of:
   a system preheat controller to automatically enable preheating of curing modules and a print zone of the printing device when the print mode controller to determines that the second print mode is to be used,
   a preparation plot controller to insert into a plot stream for the print job a full area fill preparation plot with uniform usage across all active color channels, and
   a color bar controller to insert into a plot stream for the print job a sideway color bar to be printed beside original data of the print job.

8. The controller of claim 1, further comprising a color bar controller to insert a sideway color bar into a plot stream for the print job.

9. The controller of claim 1, wherein a portion of the sideway color bar is on a first side of an image of the print job when a print swathe is in a first direction and is on a second opposite side of the image of the print job the print swathe is in a second direction opposite the first direction.

10. The controller of claim 1, further comprising a preparation plot controller to insert into a plot stream for the print job a preparation plot with uniform usage across active color channels, the preparation plot preceding original data of the print job in the plot stream.

11. The controller of claim 10, further comprising a color bar controller to insert a sideway color bar into the plot stream for the print job.

12. A method for printing, the method comprising:
   receiving a print job;
   determining whether the print job is a tile mode print job or a non-tile mode print job;
   controlling temperature of an in-use printhead based on the determination;
   printing the print job.

13. The method of claim 12, wherein controlling the temperature includes increasing a lower temperature threshold when the print job is determined to be a tile mode print job than when the print job is determined to be a non-tile mode print job.

14. The method of claim 12, further comprising, in the tile mode, printing at least one of:
   a preparation plot before printing data of the print job, and
   a sideway color bar printed on at least one side of an image of the print job.

15. The method of claim 12, further comprising, in the tile mode, preheating at least one of:
   a curing module of a printer on which the print job is to be printed, and
   a print zone of the printer.

16. A printer comprising:
   a printhead;
   a printhead temperature controller for modifying a temperature of the printhead;
   wherein the printhead temperature controller is to set a target temperature of the printhead to a first temperature in a first print mode, and
   wherein the printhead temperature controller is to set the target temperature of the printhead to a second temperature in a second print mode,
   the first mode being a non-tiled print mode and the second mode a tiled print mode in which a print job is divided into a plurality of separately-printed tiles that contain different portions of an image of a print job, wherein the tiles are assembled after printing to form the image of the print job.

17. The printer of claim 16, wherein the target temperature is a lower temperature threshold temperature, and the temperature controller is to increase the temperature of the printhead if the temperature of the printhead is below the lower temperature threshold temperature.

18. The printer of claim 17, wherein the first temperature is lower than the second temperature.

19. The printer of claim 16, wherein the target temperature is an upper temperature threshold temperature, and the temperature controller is to decrease the temperature of the printhead if the temperature of the printhead is above the upper temperature threshold temperature.

20. The printer of claim 16, wherein the printhead temperature controller comprises one of a trickle warming system and a pulse warming system.

* * * * *